(12) United States Patent
Marcus (10) Patent No.: US 11,685,133 B2
(45) Date of Patent: Jun. 27, 2023

(54) DIGITAL SYSTEMS AND PROCESSES FOR CUTTING AND CREASING CORRUGATED CARDBOARDS

(71) Applicant: Etgar Marcus, Aloney Abba (IL)

(72) Inventor: Etgar Marcus, Aloney Abba (IL)

( * ) Notice: Subject to any disclaimer, the term of this patent is extended or adjusted under 35 U.S.C. 154(b) by 312 days.

(21) Appl. No.: 16/486,168

(22) PCT Filed: Feb. 20, 2018

(86) PCT No.: PCT/IL2018/050191
§ 371 (c)(1),
(2) Date: Aug. 15, 2019

(87) PCT Pub. No.: WO2018/150432
PCT Pub. Date: Aug. 23, 2018

(65) Prior Publication Data
US 2019/0389167 A1    Dec. 26, 2019

Related U.S. Application Data

(60) Provisional application No. 62/460,893, filed on Feb. 20, 2017.

(51) Int. Cl.
| | | |
|---|---|---|
| B31B 50/00 | (2017.01) | |
| B31B 50/20 | (2017.01) | |
| B31B 50/25 | (2017.01) | |
| B31F 1/24 | (2006.01) | |
| B31B 50/14 | (2017.01) | |
| B23K 26/38 | (2014.01) | |

(52) U.S. Cl.
CPC ............ *B31B 50/006* (2017.08); *B23K 26/38* (2013.01); *B31B 50/20* (2017.08); *B31B 50/252* (2017.08); *B31F 1/24* (2013.01); *B31B 50/14* (2017.08)

(58) Field of Classification Search
CPC ..... B31B 50/006; B31B 50/20; B31B 50/252; B31B 50/14; B23K 26/38; B31F 1/24; B31F 1/08; B26F 1/26; B26F 1/24; B26F 1/02
See application file for complete search history.

(56) References Cited

U.S. PATENT DOCUMENTS 2,148,723 A * 2/1939 Bartram .................. B65D 5/68
493/475
2,579,753 A * 12/1951 Norquist ................ B21D 22/02
493/353

(Continued)

FOREIGN PATENT DOCUMENTS

WO      2015130912 A1    9/2015

OTHER PUBLICATIONS

International Search Report for International Application No. PCT/IL2018/050191 dated Jun. 14, 2018.

(Continued)

*Primary Examiner* — Thomas M Wittenschlaeger
*Assistant Examiner* — Katie L Gerth
(74) *Attorney, Agent, or Firm* — Dilworth & Barrese, LLP (57) ABSTRACT

The present invention relates to systems and processes for cutting and creasing corrugated cardboards, and more specifically, to digital system and processes for cutting and creasing corrugated cardboards, wherein the system includes an array of cutting elements that can be dynamically configured to cut and/or crease a wide range of contours.

15 Claims, 9 Drawing Sheets

(56) References Cited

U.S. PATENT DOCUMENTS

| | | | | | |
|---|---|---|---|---|---|
| 3,103,243 | A | * | 9/1963 | Senior | B21D 51/2646 |
| | | | | | 72/332 |
| 3,226,527 | A | * | 12/1965 | Harding | B23K 26/0846 |
| | | | | | 219/121.79 |
| 3,268,163 | A | | 8/1966 | Ehrat | |
| 3,756,051 | A | * | 9/1973 | Rebsamen | B21D 37/18 |
| | | | | | 72/20.3 |
| 3,756,128 | A | * | 9/1973 | Armstrong | B31C 3/00 |
| | | | | | 493/290 |
| 4,672,168 | A | * | 6/1987 | Saunders | A24C 5/007 |
| | | | | | 219/121.7 |
| 4,823,661 | A | * | 4/1989 | Freres | B26D 7/2614 |
| | | | | | 83/146 |
| 5,106,358 | A | * | 4/1992 | Meschi | B41J 11/58 |
| | | | | | 493/27 |
| 6,056,460 | A | * | 5/2000 | Suzuki | B65H 35/0006 |
| | | | | | 400/621 |
| 6,126,067 | A | * | 10/2000 | Grigsby, Jr. | B26F 1/16 |
| | | | | | 220/676 |
| 6,147,319 | A | * | 11/2000 | Imai | A24C 5/007 |
| | | | | | 219/121.62 |
| 6,217,497 | B1 | * | 4/2001 | Laudenberg | B31B 50/00 |
| | | | | | 493/194 |
| 6,578,758 | B1 | * | 6/2003 | Grigsby, Jr. | B26F 1/24 |
| | | | | | 47/84 |
| 10,744,595 | B2 | * | 8/2020 | Zeygerman | B23K 26/702 |
| 2003/0121380 | A1 | * | 7/2003 | Cowell | B26F 1/24 |
| | | | | | 83/30 |
| 2006/0027066 | A1 | * | 2/2006 | Jensen | B21D 28/36 |
| | | | | | 83/30 |
| 2006/0219081 | A1 | * | 10/2006 | Ito | B26F 1/14 |
| | | | | | 83/684 |
| 2010/0039665 | A1 | * | 2/2010 | Tsukada | B41J 11/66 |
| | | | | | 358/1.15 |
| 2010/0230857 | A1 | * | 9/2010 | Muhs | B29C 66/45 |
| | | | | | 264/284 |
| 2011/0221094 | A1 | * | 9/2011 | Gross | B29C 66/81264 |
| | | | | | 264/284 |
| 2011/0287608 | A1 | * | 11/2011 | Saegusa | B23K 26/53 |
| | | | | | 257/E21.599 |
| 2012/0111164 | A1 | * | 5/2012 | Chizek | B65H 35/10 |
| | | | | | 83/699.61 |
| 2013/0318923 | A1 | * | 12/2013 | Ishizawa | B65B 3/02 |
| | | | | | 53/452 |
| 2014/0124490 | A1 | * | 5/2014 | Bangel | B31D 1/026 |
| | | | | | 219/121.72 |
| 2015/0174780 | A1 | * | 6/2015 | Newell | B26D 11/00 |
| | | | | | 83/35 |
| 2016/0288375 | A1 | * | 10/2016 | Kakitani | B29C 43/36 |
| 2018/0193964 | A1 | * | 7/2018 | Joos | D06H 7/10 |
| 2019/0105737 | A1 | * | 4/2019 | Mikkelsen | B23K 37/0211 |
| 2019/0111516 | A1 | * | 4/2019 | Meyer | B23K 26/0861 |
| 2021/0016978 | A1 | * | 1/2021 | Sims | B65H 29/66 |
| 2021/0094200 | A1 | * | 4/2021 | Malme | B26F 1/04 |

OTHER PUBLICATIONS

Master Blanker CBL (English) | High Speed Automated Blanking System | Laserck Corporation: https://www.youtube.com/watch?t=194&v=ChvglkSPZWc&feature=youtu.be.

* cited by examiner

DIGITAL SYSTEMS AND PROCESSES FOR CUTTING AND CREASING CORRUGATED CARDBOARDS

FIELD OF THE INVENTION

The present invention relates to systems and processes for cutting and creasing corrugated cardboards, and more specifically, to digital system and processes for cutting and creasing corrugated cardboards, wherein the system includes an array of cutting elements that can be dynamically configured to cut and/or crease a wide range of contours.

BACKGROUND OF THE INVENTION

The traditional industry of cutting and creasing corrugated cardboards uses die cutters which can be either in a rotary, for continuous die-cutting, or in a flatbed configuration, for intermittent die-cutting. In these prior art methods, the corrugated cardboard substrate is cut and creased according to a pre-set punching template (usually made of wood, metal knives and rubber elements for knives release).

United States Patent Application 2016/0332261, for example, discloses a system and method for handling and creasing cardboard in the die-crease industry.

The rotary type machines provide high productivity, because of continuous operation, but have a poor cutting accuracy due to slip between the blank and the cutter. Furthermore, rotary type machines are complicated and expensive to mount blades on a rotary drum. The flatbed type machines provide relatively high cutting accuracy and easy blade mounting on a flat plate. However, the productivity is low because of intermittent operation and the blade is liable to get marred because of greater cutting resistance. Both types require preparing of dedicated punching templates, which has associated manufacturing and assembly costs, set-up time on the machine by a dedicated skilled operator, and later expensive handling and storage costs.

There is therefore a need for a system and a process of cutting and creasing corrugated cardboards that provides both high accuracy and high productivity, and reduces the associated overhead and cost of dedicated punching templates.

SUMMARY OF THE INVENTION

The principal intentions of the present invention include providing systems and processes of cutting and creasing corrugated cardboards that provide both high accuracy and high productivity. The system performs digital cutting and creasing of a corrugated cardboard according to a program-controlled contour.

The cutting or creasing operation is performed while the cardboard moves beneath the cutting and creasing bridge apparatus having an array of multiple punching elements that are selectively actuated by a control unit. Eventually, a cluster of overlapping punch holes is created to form cutting lines that enable separation of the contoured cardboard from the waste. Alternatively, a cluster of either non-overlapping punch holes or either overlapping or non-overlapping non-through punch holes or cuts is created to form crease lines that enable folding of the cardboard at the creased contoured lines.

The present invention will be described in terms of the cardboard being a corrugated cardboard or a plain cardboard, but the present invention is not limited to corrugated cardboards or plain cardboard, and is applicable to wide range of cardboards and other types of substrates, commonly used in the packaging industry, having a width, including, with no limitations, carton board, folding cartons, paperboard cartons, heavy solid board and semi-rigid plastics (including products such as Polypropylene (PP), Polyethylene (PE), Polyvinylchloride (PVC), Polyesterterephtalate (PET), and Polylactic acid (PLA).

According to the teachings of the present invention there is provided a cutting- and creasing system that includes a conveyer for supporting a cardboard, a cardboard-motion-control unit configured to control the motion of the conveyer in a first direction, and at least one punching head unit. The at least one punching head unit includes an array of punching elements that are individually and selectively actuatable by a punching-control-unit to move axially with a distal tip that faces the cardboard, between a withdrawn position and a cutting position. The punching head unit is firmly held such that the punching elements are orthogonal to the cardboard.

The punching elements are distributed in a selected areal pattern within the array and with respect to the first direction and with respect to a perpendicular-second-direction, and wherein the perpendicular-second-direction is perpendicular to the first direction.

The punching control unit is preconfigured to timely move each of the punching elements from the withdrawn position to the cutting position, relative to the conveyer, and to immediately withdraw back punching element to the withdrawn position, to thereby form a through hole across the cardboard or a non-through hole or cut.

A cut line is formed by a respective cluster of overlapping the through holes. A crease line is formed by a respective cluster of either non-overlapping the through holes or either overlapping or non-overlapping the non-through holes or cuts.

Preferably, the cutting-and-creasing system further includes a cutting-and-creasing-bridge that firmly carries the at least one punching head unit. The cutting-and-creasing system further includes a bridge-motion-control module for moving the cutting-and-creasing-bridge apparatus in the first direction or in an orthogonal direction, being the axial direction of a moving the punching element, wherein the orthogonal direction is perpendicular to both the perpendicular-second-direction and the first direction.

The cutting-and-creasing system may further include at least one cardboard-detecting sensor for detecting the rotational state of the cardboard with respect to the first direction and the perpendicular-second-direction.

Optionally, the punching control unit is preconfigured according to an uploaded graphical digital file to timely and sequentially control the operation of selected punching elements.

Optionally, the punching elements includes a conic end section and either a sharp or blunt pointed end.

Optionally, a solenoid based actuating unit is used to move the punching element between the withdrawn position and the cutting position.

Optionally, a crank based actuating unit is used to move the punching element between the withdrawn position and the cutting position, wherein the actuating is selected from a group of mechanisms including an eccentric mechanism, a hydraulic based mechanism and a pneumatic mechanism.

Optionally, the punching element is adapted to emit a lubricating agent from a nozzle at the pointed end of the punching element to thereby locally reduce the friction with the cardboard substrate before a cutting operation by the punching element.

Optionally, the punching element is adapted to emit an elastomeric lubricating agent from a nozzle at the pointed end of the punching element to thereby locally strengthen a crease line after a creasing operation by the punching element, to prevent tear of the crease line.

Optionally, the punching element is adapted to emit etching liquid from a nozzle at the pointed end of the punching element.

Optionally, the cutting and creasing is performed by an etching liquid to be applied by ejecting drops of the etching liquid is stored in a suitable container, wherein a chemical etching reaction between the etching liquid and the cardboard locally dissolves the cardboard.

Optionally, the chemical etching reaction is triggered by an exposure to an energy field selected from a group energy fields including ultraviolet light, infrared light and heat.

Optionally, the punching element is a coherent electromagnetic radiation beam. The coherent electromagnetic radiation beam may be operatively coupled with a thin layer of transparent polymeric lens and piezo elements configured to rapidly change the focus of the lens to different depths for accommodating different cardboards thicknesses and material types.

Optionally, the creasing and cutting end of the punching element is a blade having a width. The blade punching element may be a rotatable punching element operatively coupled with a controllable actuator.

Optionally, all of the punching elements are activated according to a digitally pre-set physical template, operating all at once.

According to further teachings of the present invention there is provided a process of digitally cutting and creasing corrugated cardboard substrate, including the steps of:

a) providing a cutting- and creasing system;
b) securing corrugated cardboard onto the conveyer;
c) detecting the corrugated cardboard by activating at least one cardboard detecting sensor to thereby acquire sensed data;
d) analyzing the sensed data to thereby determine the orientation of the corrugated cardboard with respect to the array of punching elements:
e) determining if re-alignment of the cardboard is needed based on the analyzed sensed data;
f) upon determining that re-alignment of the cardboard is not needed, proceed with step (j);
g) upon determining that re-alignment of the cardboard is needed, further analyzing the sensed data to thereby determine if all of the preconfigured cutting and creasing contour segments are within the width covered by the array of punching elements;
h) upon determining that not all of the preconfigured cutting and creasing contour segments are within the width covered by the array of punching elements, repositioning and re-securing the corrugated cardboard onto the conveyer, and proceed with step (c);
i) upon determining that all of the preconfigured cutting and creasing contour segments are within the width covered by the array of punching elements, reconfiguring the punching elements selection according to the detected orientation deviation of the cardboard;
j) subdividing, by the control unit, the cardboard pixel array into one of these types: cut line, crease line or waste;
k) assigning respectively selected punching elements to form the preconfigured cutting lines, creasing lines and waste regions;
l) determining, by the control unit, if the next row of cardboard pixels contains at least one cut or crease pixel, wherein the next row of cardboard pixels is parallel to the perpendicular-second-direction;
m) upon determining that the next row of cardboard pixels contains at least one cut or crease pixel, the control unit activates the respectively selected punching elements;
n) while the last row of cardboard pixels has not been processed, perform steps (l) and (m); and
o) upon determining that the last row of cardboard pixels has been processed, proceed to a waste disposal station.

Optionally, the cutting- and creasing system further includes a cutting-and-creasing-bridge carrying the at least one punching head unit.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIG. 9b illustrates a top view of an example of an actuator for the blade punching element shown in FIG. 9a.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

An embodiment is an example or implementation of the inventions. The various appearances of "one embodiment," "an embodiment" or "some embodiments" do not necessarily all refer to the same embodiment. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. It is understood that the phraseology and terminology employed herein are not to be construed as limiting and are for descriptive purpose only.

Meanings of technical and scientific terms used herein are to be commonly understood as to which the invention belongs, unless otherwise defined. The present invention can be implemented in the testing or practice with methods, processes and materials equivalent or similar to those described herein.

It should be noted that orientation related descriptions such as "bottom", "up", "upper", "down", "lower", "top" and the like, assumes that the associated item is operationally situated.

Figure 1:
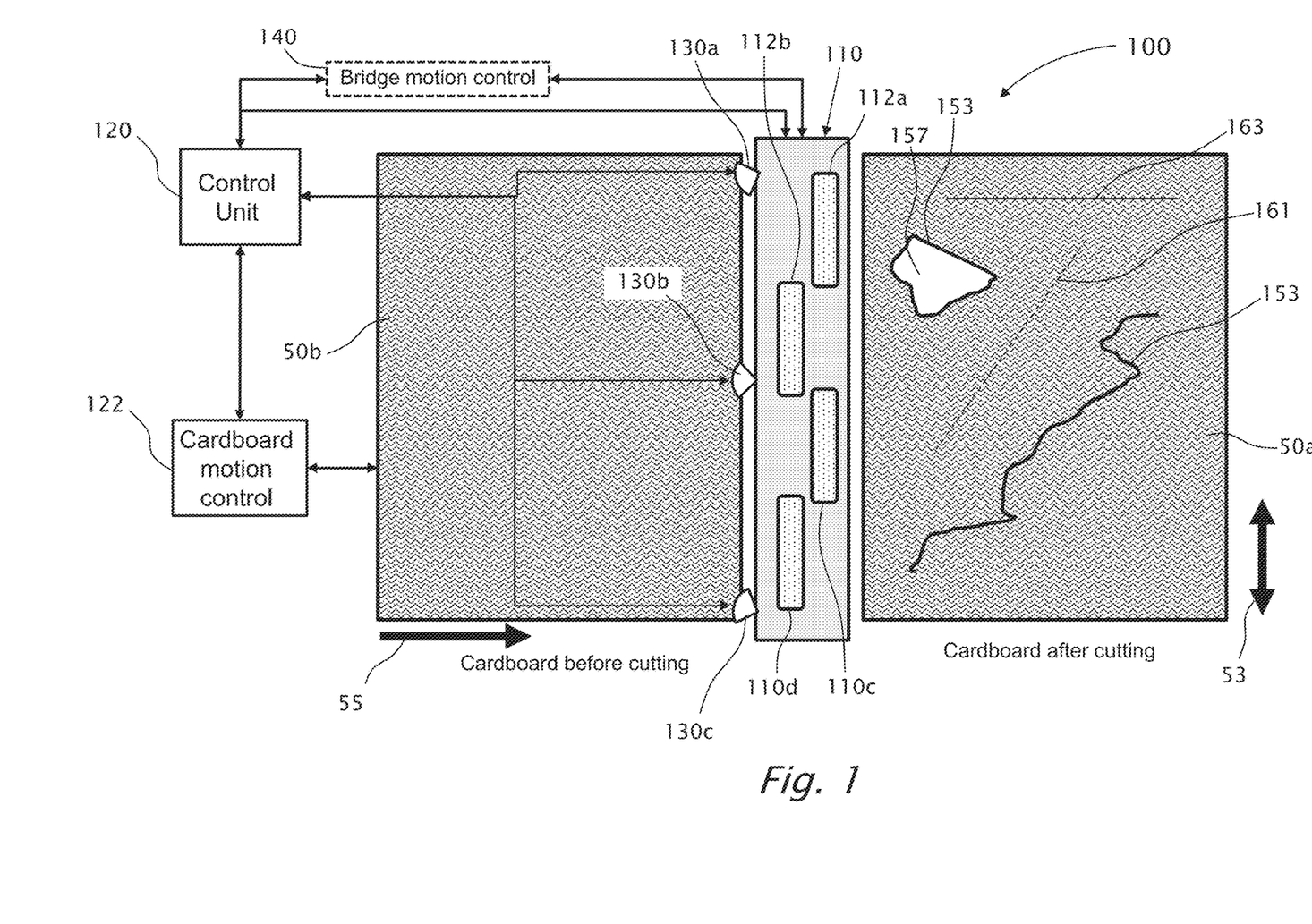
FIG. 1 is a top view schematic illustration of a cutting and creasing system, according to embodiments of the present invention, and the operation workflow of the digital punching operation performed by the system, wherein not all elements are required in order to demonstrate an invention.
Figure 2:
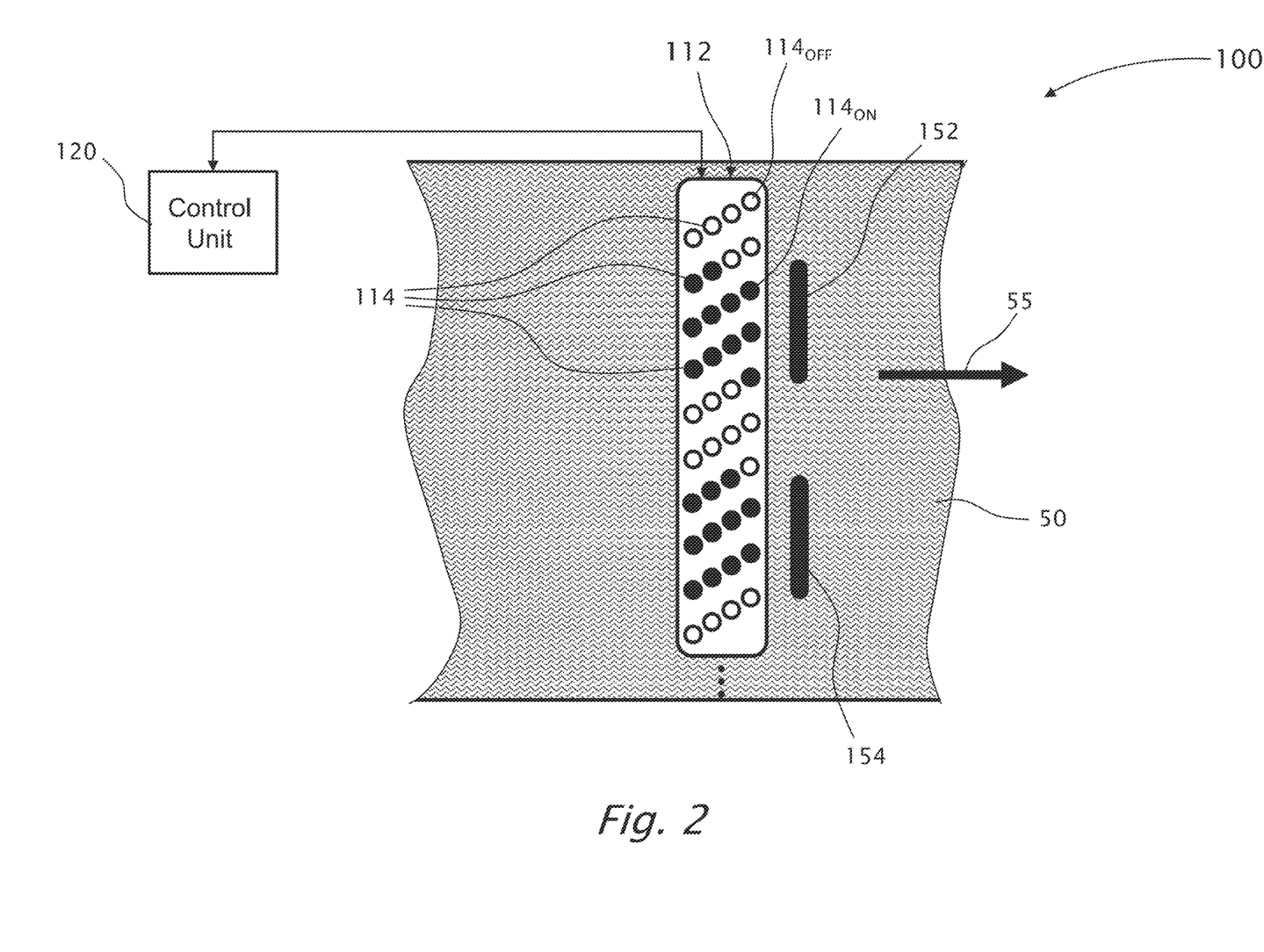
FIG. 2 illustrates an example punching head unit of the cutting and creasing bridge apparatus of the cutting and creasing system, as shown in FIG. 1, wherein not all elements are required in order to demonstrate an invention.

Reference is made to the drawings. FIG. 1 is a top view schematic illustration of an example of cutting and creasing system 100 according to embodiments of the present invention, and the operation workflow of the digital punching operation performed by the system, wherein not all elements are required in order to demonstrate an invention. FIG. 2 illustrates an example punching head unit 112 of cutting-and-creasing-bridge apparatus 110, wherein not all elements are required in order to demonstrate an invention.

Cutting and creasing system 100 includes at least one cutting-and-creasing-bridge 110 having at least one punching head unit 112, each including an array of multiple punching elements 114 that are selectively actuated by a control unit 120. Cutting and creasing system 100 further includes a cardboard-motion-control unit 122 that controls the motion of a conveyer 180 and of a corrugated cardboard substrate 50 that is secured thereto, wherein when corrugated cardboard substrate 50 moves below punching head unit 112, corrugated cardboard 50 is cut and/or creased according to a graphical digital file, containing a desired set of one or more contours, uploaded to and processed by control unit 120.

Figure 3A:
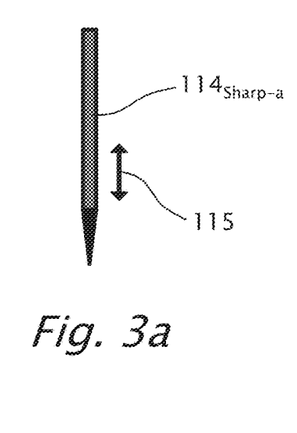
FIG. 3a illustrates an example sharp creasing and/or punching element, according to some embodiments of the present invention.
Figure 3B:
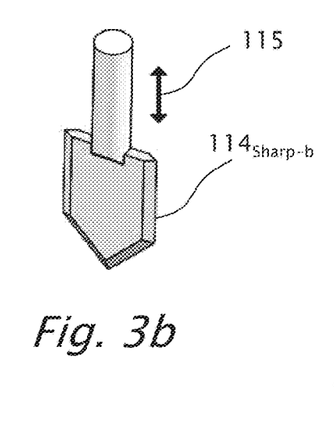
FIG. 3b illustrates an example sharp creasing and/or punching element, according to other embodiments of the present invention.
Figures 3C, 3D:
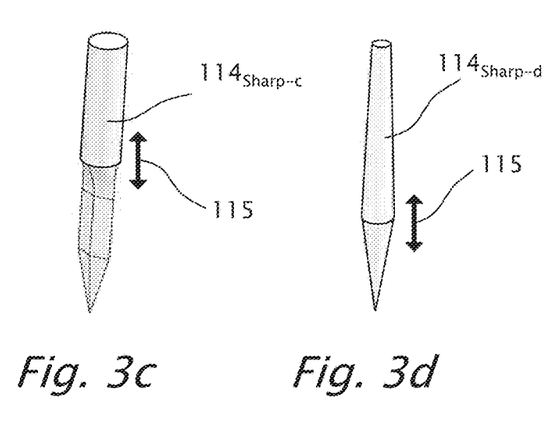
FIG. 3c illustrates an example sharp creasing and/or punching element, according to other embodiments of the present invention.
FIG. 3d illustrates an example sharp creasing and/or punching element, according to other embodiments of the present invention.
Figure 3E:
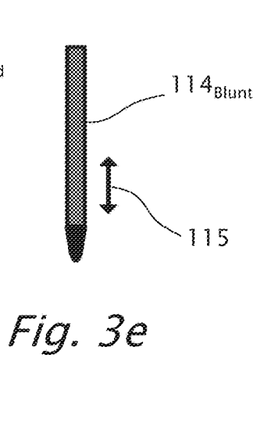
FIG. 3e illustrates an example blunt creasing and/or punching element, according to other embodiments of the present invention.

Reference is also made to FIGS. 3a-3d, illustrating various examples, with no limitations, of sharp/blade punching elements $114_{sharp}$, according to some embodiments of the present invention, having a conic end section, blade shaped end section and a sharp pointed end; and to FIG. 3e illustrating an example blunt creasing punching element $111_{blunt}$, according to other embodiments of the present invention. Punching elements $114_{sharp}$ are typically used to cut cardboard 50 but may also be used to crease cardboard 50 by, for example, cut cardboard 50 in a non-continuous manner or cut cardboard 50 not to the full thickness of cardboard 50. Punching element $114_{blunt}$ is typically used to crease cardboard 50, but may also be used otherwise, for example, to separate and/or discard of the waste.

Cutting and creasing system 100 may further include at least one cardboard-detecting sensor 130 that detects the rotational state of cardboard 50 with respect to cutting-and-creasing-bridge apparatus 110. Cutting and creasing system 100 may further include a bridge-motion-control module 140 for moving cutting-and-creasing-bridge apparatus 110 in the direction 55 of the conveying cardboard 50, to thereby reduce the stress on activated punching elements 114, or in Z-axis direction 115 to accommodate various cardboard thicknesses and material types, direction being the axial direction of a moving punching element 114, and wherein the Z-axis (orthogonal to cardboard 50) direction is perpendicular to both the first direction 55 of the conveying cardboard 50 and the lateral direction 53, being perpendicular to the first direction 55.

Figure 4:
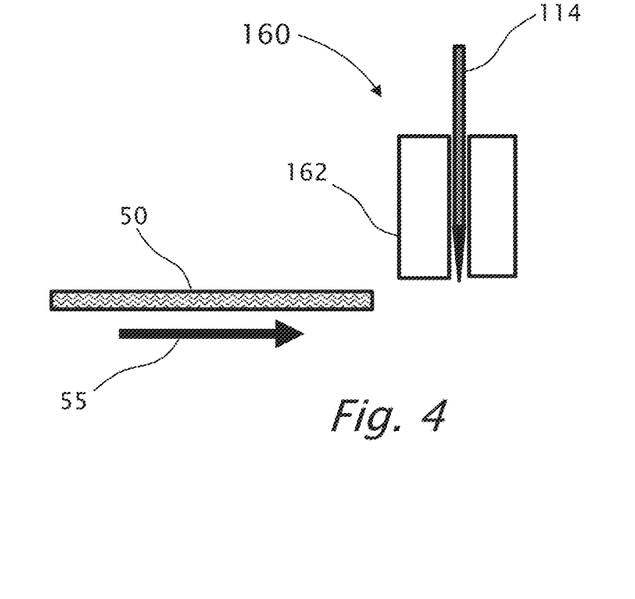
FIG. 4 illustrates an example solenoid based actuating unit for a punching element.
Figure 5:
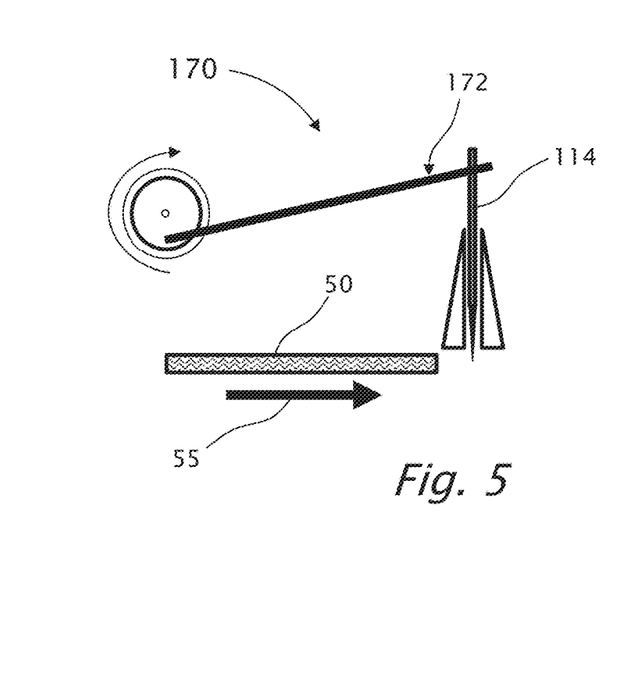
FIG. 5 illustrates another example actuating unit for a punching element, wherein the actuating unit is based on a crank mechanism.

Reference is now also made to FIG. 4, illustrating an example solenoid based actuating unit 162 for a punching element 114, forming a punching module 160, according to some embodiments of the present invention. FIG. 5 illustrates another example actuating unit 172 for a punching element 114, forming a punching module 170, wherein the actuating unit is based on a crank mechanism 172. The punching module (160, 170) facilitates fast up and down movement 115 (see FIGS. 3a-3e and 6a-6b) in the Z-axis direction (orthogonal) of the coupled punching element 114, towards and from the corrugated cardboard substrate 50 being cut and/or creased. It should be noted that other actuating methods may be used, including hydraulic based actuating mechanisms and pneumatic based actuating mechanisms.

Figure 6A:
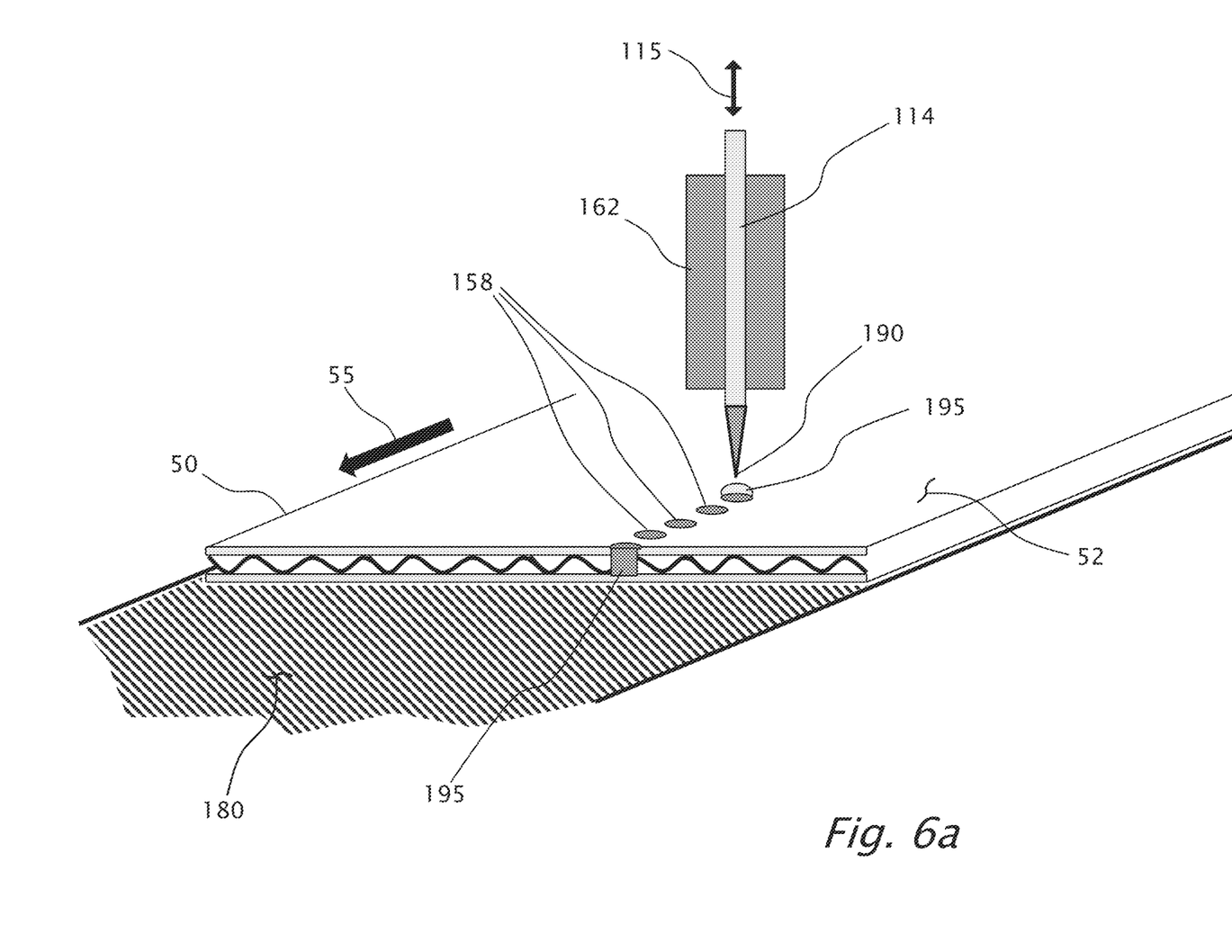
FIG. 6a illustrates one possible embodiment of a punching module, according to some embodiments of the present invention.

FIG. 6a illustrates one possible embodiment of a punching module (160, 170), according to some embodiments of the present invention. Punching element 114 is shown in withdrawn position, that is, in the upper, non-penetrating position. The upper position of punching element 114 is as proximal to the upper surface 52 of corrugated cardboard substrate 50 as possible, to shorten the motion time of the actuated punching element 114.

Optionally, punching element 114 may be adapted to emit a lubricating agent 195 or etching liquid 410 such as from a nozzle at the punching end 190 of punching element 114. Lubricating agent 195 may be used, for example, at a cut line 153 (see FIG. 1) to locally reduce the friction with the cardboard substrate 50 before the cutting operation. Lubricating agent 195 may be used, for example, at a crease line (161, 163, see FIG. 1) during the creasing operation. The lubricating agent 195 may be an elasticizing material, which is inserted locally into holes punched 158 formed in the cardboard 50 and thus makes it more robust to address potential fractures and tears, which may be evolved during the folding operation. Lubricating agent 195 may also be used in the cutting operation to minimize tears during the cutting and waste separation operations. The etching liquid causes a reaction between the etching liquid and cardboard 50 dissolving cardboard 50 from within.

Figure 6B:
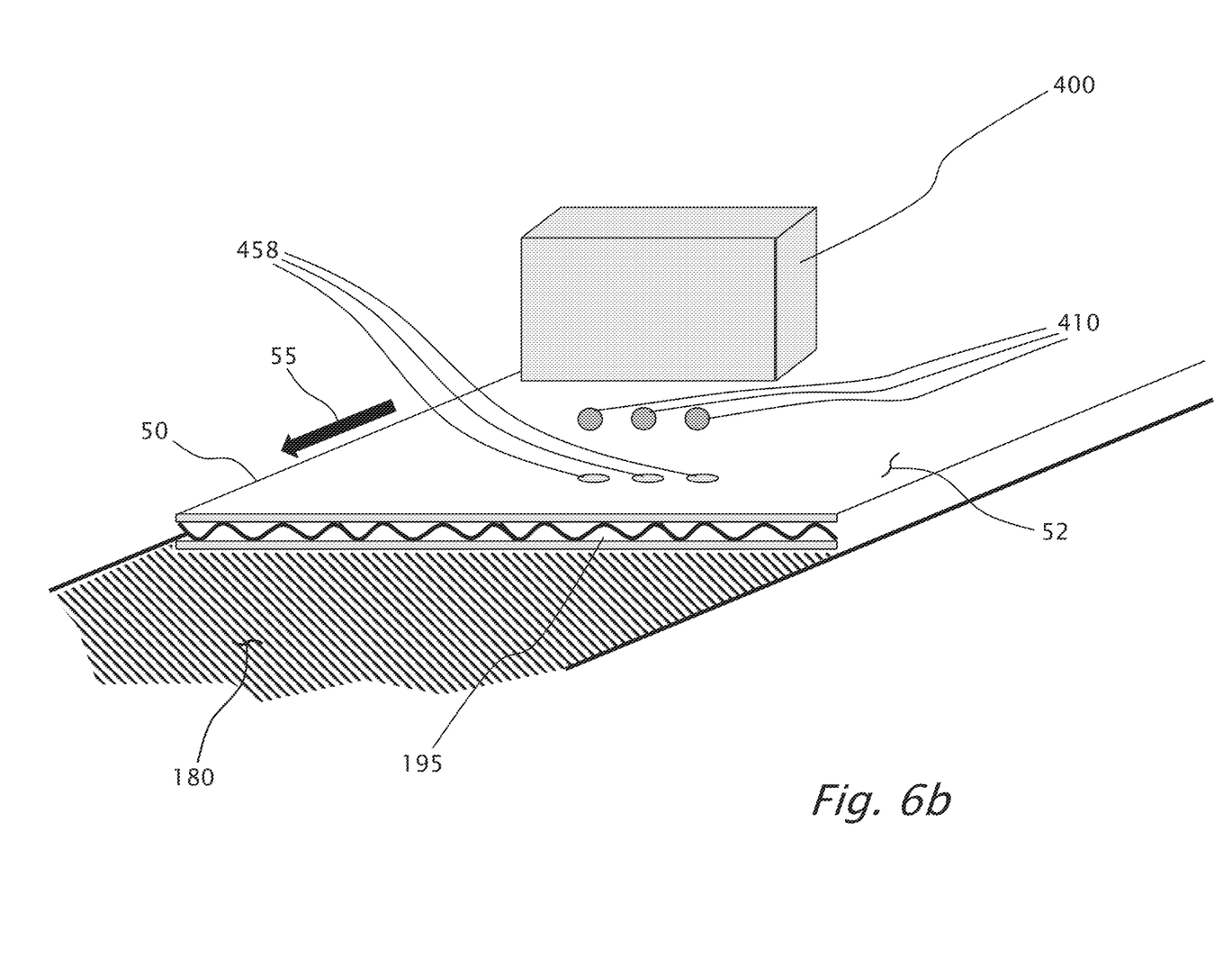
FIG. 6b illustrates another possible embodiment of cutting and creasing elements.

FIG. 6b illustrates another optional embodiment of cutting and creasing elements, wherein instead of punching elements 114, the cutting and/or creasing is performed by etching liquid 410. The etching liquid is applied by ejecting drops of the etching liquid 410 using any suitable container 400 (e.g. digital ink-jet printheads 400). The local chemical reaction between the etching liquid 410 and cardboard 50 dissolves cardboard 50 at specific points 458, where the drop of the etching material 400 touches the cardboard (see FIG. 6b) to thereby form the desired cutting or creasing line effect.

Optionally, the chemical etching reaction yielding the etched points 458 may be triggered by exposure to an energy field, for example: ultraviolet light, infrared light, heat or other sources of radiation, which are triggered at a later step in the cutting and/or creasing process.

Figure 7A:
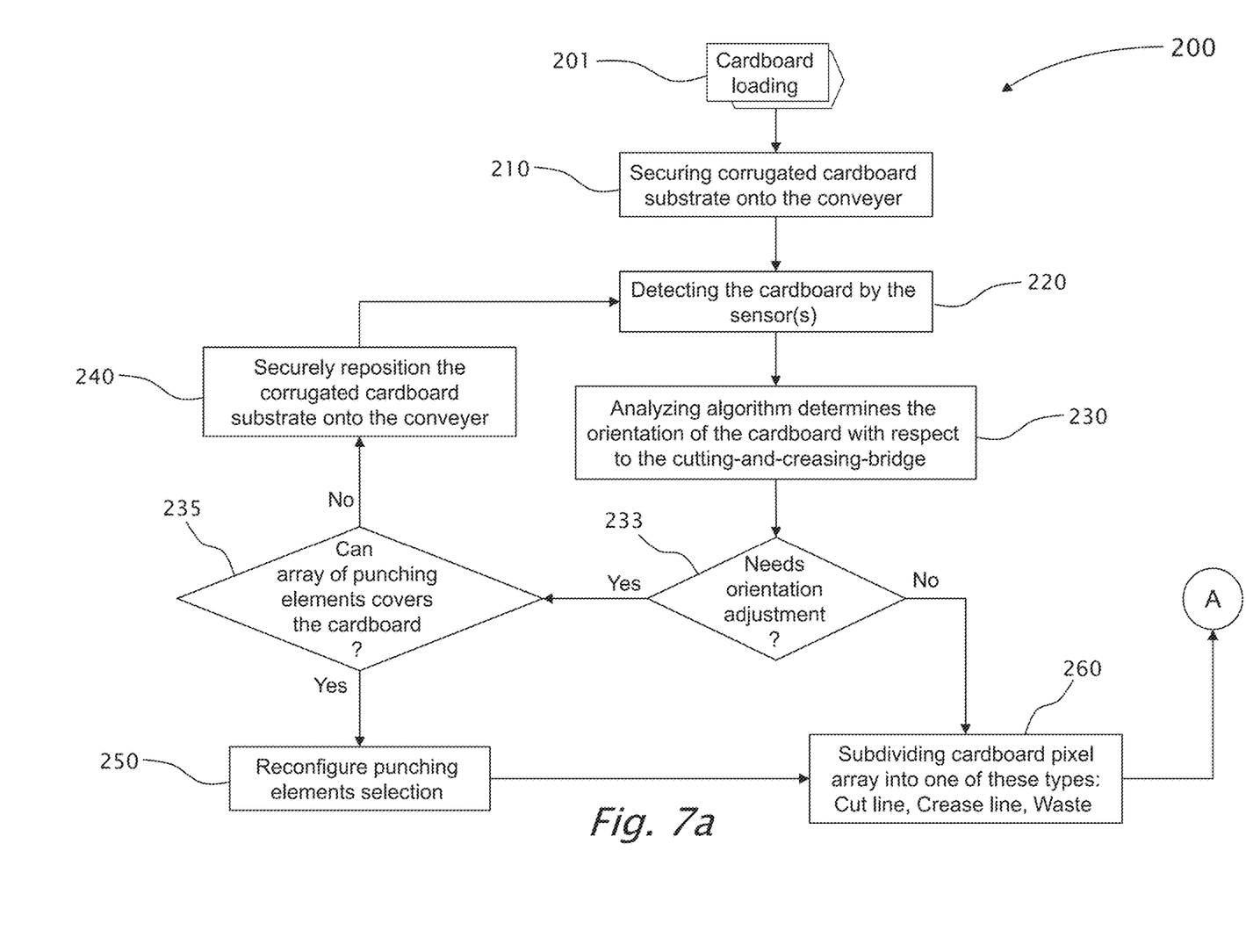
FIGS. 7a and 7b present a schematic flow chart of an example basic process of digitally cutting and creasing corrugated cardboard substrate, according to some embodiments of the present invention.
Figure 7B:
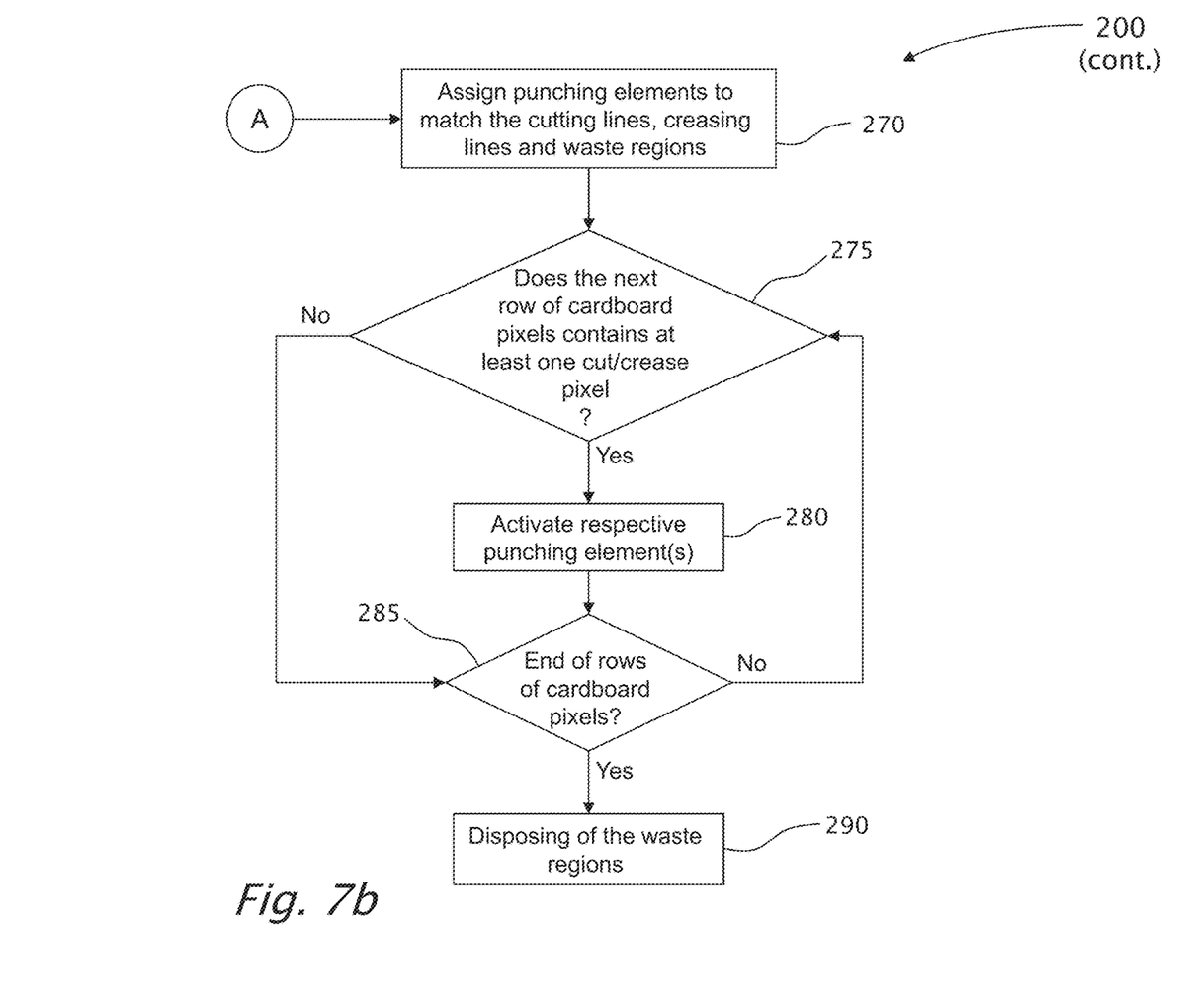

Reference is now also made to FIGS. 7a and 7b, showing a schematic flow chart of an example basic process 200 of digitally cutting and creasing corrugated cardboard substrate. The corrugated cardboard 50 cutting and creasing process 200 begins with a step 201 of loading corrugated cardboard 50 onto a conveyer 180. Also, the cutting and creasing contour segments associated with the loaded corrugated cardboard 50 are uploaded into the computerized control unit 120 and the set and order of the punching elements 114 is configured. The cutting and creasing process 200 proceeds as follows:

Step 210: Securing corrugated cardboard substrate onto the conveyer.

The operator of cutting and creasing system 100 secures corrugated cardboard substrate 50 onto conveyer 180, forming a substantially flat and rigid substrate.

Step 220: Detecting the cardboard by the sensor(s).

Cutting and creasing system 100 activates at least one cardboard-detecting sensor 130, such as, with no limitations, an image sensor, that detects the rotational state of cardboard 50 with respect to cutting-and-creasing-bridge apparatus 110. Optionally, an image sensor is used to detect fiducials marked on the cardboard, that are used to determine the cutting and creasing contour segments.

Step 230: Determining the orientation of the cardboard with respect to the cutting-and-creasing-bridge.

An analyzing algorithm analyzes the sensed data and determines the orientation of the cardboard 50 with respect to the cutting-and-creasing-bridge apparatus 110.

Step 233: Check if the cardboard needs an orientation adjustment.

Cutting and creasing system 100 checks if any of the sensors indicate that re-alignment of cardboard 50 is needed.

If the cardboard does not need an orientation adjustment, go to step 260.

Step 235: Check if the array of punching elements covers the cardboard.

Cutting and creasing system 100 activates checks if all of the cutting and creasing contour segments are within the width covered by the array of punching element 114, then no re-alignment of cardboard 50 is needed.

If the cardboard does not need an orientation adjustment, go to step 250.

Step 240: configuration completed—open session.

It has been determined that the cardboard does need an orientation adjustment. Therefore, an automatic alignment mechanism or a manual operation by the operator of cutting and creasing system 100 securely re-aligns corrugated cardboard substrate 50 onto conveyer 180. Go to step 220.

Step 250: Reconfigure punching elements selection.

It has been determined that cardboard 50 does need an orientation adjustment. However, no automatic alignment mechanism nor a manual operation by the operator is needed and the set and order of the punching elements 114 is reconfigured according to the detected orientation deviation of cardboard 50 with respect to the cutting-and-creasing-bridge apparatus 110.

Step 260: Subdividing cardboards pixel array into one of these types: cut line 153, crease line (161, 163), waste region 157.

Computerized control unit 120 determines, for each pixel that is associated with a particular punching element 114, if this cardboard pixel is part of the final product, or is part of a cut line 153, or is part of a crease line (161, 163), or is part of a waste region 157.

Step 270: Assign punching elements to match the cutting lines 153, crease lines (161, 163) and waste regions 157.

Computerized control unit 120 assigns punching elements 114 to match the cutting lines 153, crease lines (161, 163) and waste regions 157, in accordance with the subdivision of the cardboard pixels.

Step 275: Check if the next row of cardboard pixels contains at least one cut/crease pixel.

Computerized control unit 120 checks if the next row of cardboard pixels contains at least one cut/crease pixel, wherein the row of cardboard pixels is parallel to cutting-and-creasing-bridge apparatus 110.

If not, go to step 285.

Step 280: Activate respective punching element(s).

Computerized control unit 120 activates the respective punching element(s) 114.

If so, the cutting and creasing process is complete.

Proceed to the waste disposal station.

Step 285: Check if the last row of cardboard pixels was reached.

Computerized control unit 120 checks if the last row of cardboard pixels was reached.

If so, the cutting and creasing process is complete.

Proceed to the waste disposal station.

Step 290: Disposing of the waste regions.

Computerized control unit 120 activates the punching elements associated with disposing of the waste regions. For example, blunt punching elements $114_{blunt}$ may be used to separate and/or discard of the waste regions.

[end of process 200]

Figure 8:
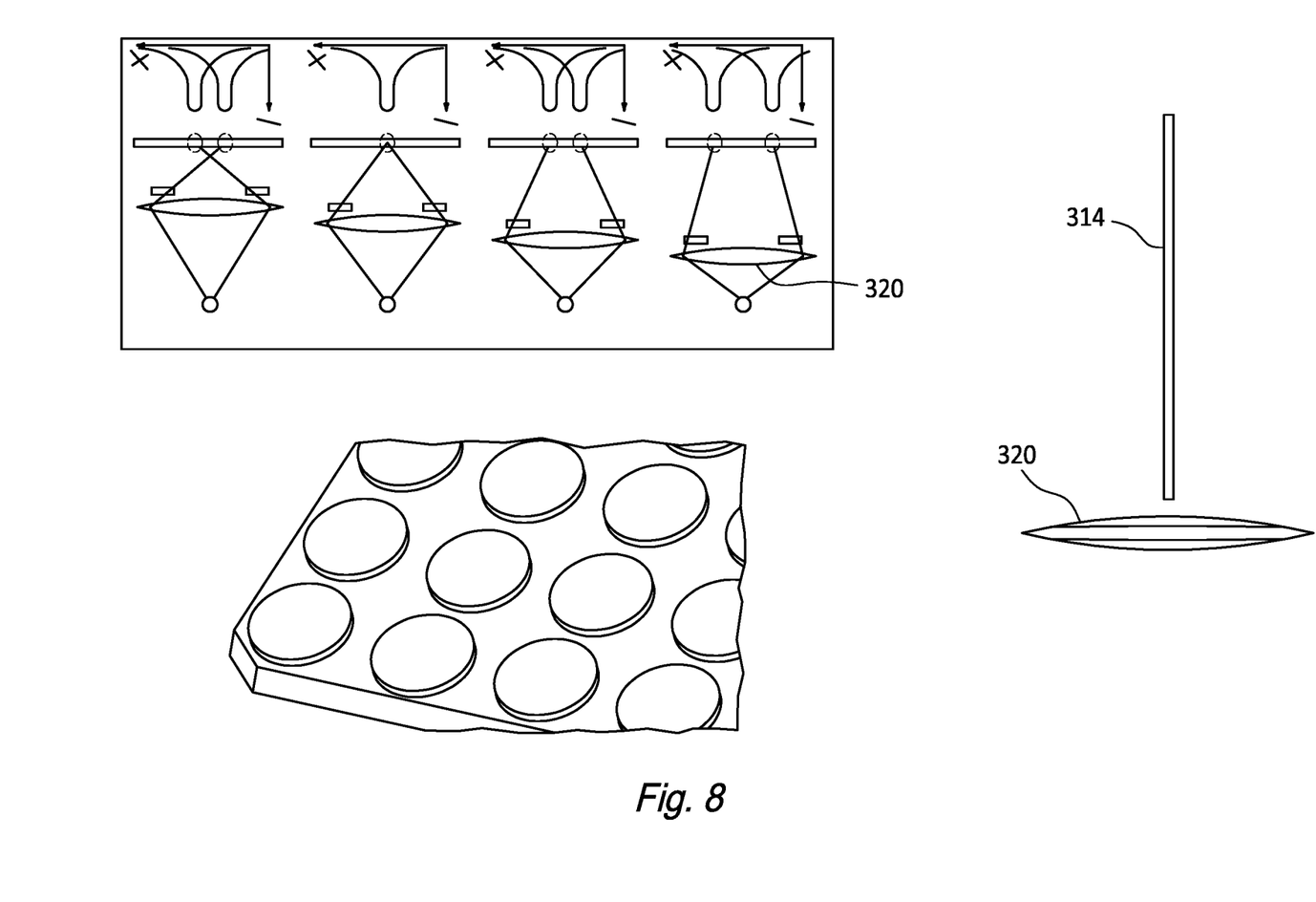
FIG. 8 illustrates one possible embodiment of a punching module, based on a coherent electromagnetic radiation beam according to some embodiments of the present invention.

Optionally, a coherent electromagnetic radiation (laser) beam 314 is used as a punching element (see FIG. 8). The punching module further includes a thin layer transparent polymeric lens 320 and piezo elements configured to rapidly change the focus of the lens to different depths to accommodate different cardboards thicknesses and material types.

Figure 9A:
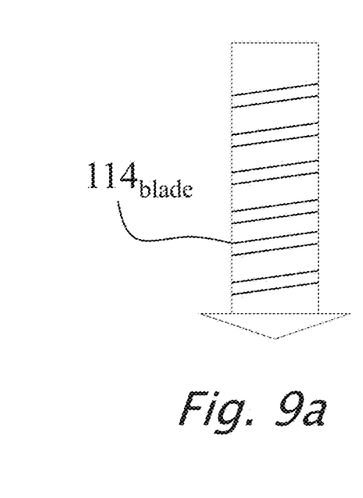
FIG. 9a illustrates an example of a blade punching element.
Figure 9B:
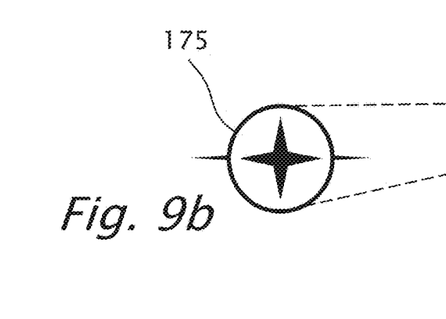
Figure 9C:
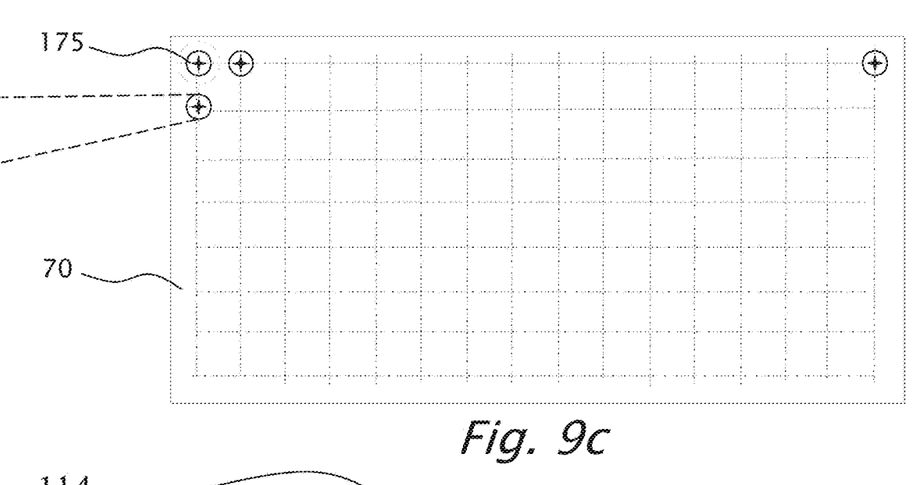
FIG. 9c illustrates an example of the positioning of the cutting modules shown in FIG. 9a and FIG. 9b.
Figure 9D:
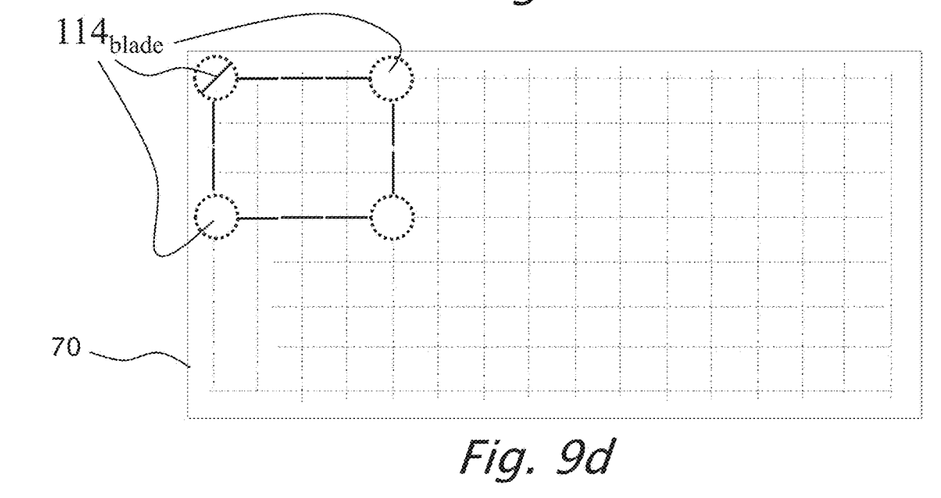
FIG. 9d illustrates an example of the positioning of the blade punching elements over the bed cutting unit.

Optionally, creasing blade punching element $114_{blade}$ does not have a point cutting end, but has some width to form a blade. Furthermore, blade punching element $114_{blade}$ may be a rotatable punching blade coupled by an actuator 175 that is controlled, for example, by control unit 120. FIG. 9a illustrates an example of a blade punching element $114_{blade}$; FIG. 9b illustrates a top view of an example of an actuator 175; FIG. 9c illustrates an example of the positioning of cutting modules coverage bed cutting unit 70; and FIG. 9d illustrates an example of the positioning of blade punching elements $114_{blade}$ over bed cutting unit 70.

Optionally, all punching elements are activated according to a digitally pre-set physical template, which operates at once all of the punching elements and types (cut, crease or waste)—like in a fakir bed.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A cutting-and-creasing system configured to form a predetermined pattern of cuts and creases within a cardboard, comprising:
   a) a conveyer supporting the cardboard;
   b) a cardboard-motion-control unit configured to control the motion of said conveyer in a first direction;
   c) at least one punching head unit including an array of punching elements that are individually and selectively actuatable by a punching-control-unit to move axially with a distal tip that faces said cardboard, between a withdrawn position and a cutting position, wherein said punching head unit is firmly held such that said punching elements are orthogonal to the cardboard;
   wherein said punching elements are distributed in a selected areal pattern within said array having said first direction and a second direction; said second direction is perpendicular to said first direction;
   said punching-control-unit is preconfigured to timely perform a punching step, the punching step includes moving one or more of said punching elements from said withdrawn position to said cutting position, relative to said conveyer, and immediately withdrawing said one or more of said punching elements to said withdrawn position, to thereby form through holes across said cardboard, or non-through holes, or cuts;
   a cut line is formed by a respective cluster of overlapping said through holes; and
   a crease line is formed by a respective cluster of either non-overlapping said through holes, or either overlapping or non-overlapping said non-through holes, or cuts;
   d) a cutting-and-creasing-bridge carrying said at least one punching head unit; and
   e) a bridge-motion-control module for moving said cutting-and-creasing-bridge in said first direction and in an orthogonal direction perpendicular to both said first direction and said second direction,
   wherein each said movable punching element comprises a nozzle at a punching end thereof to emit a lubricating agent to thereby locally reduce friction with the cardboard substrate before a cutting operation by said punching element.

2. The cutting-and-creasing system as in claim 1, further comprises at least one cardboard-detecting sensor for detecting the rotational state of said cardboard with respect to said first direction and said perpendicular-second-direction.

3. The cutting-and-creasing system as in claim 1, wherein said punching control unit is preconfigured according to an uploaded graphical digital file to timely and sequentially control the operation of selected said punching elements.

4. The cutting-and-creasing system as in claim 1, wherein said punching elements each comprises a stem and a conical conic end section protruding from said stem.

5. The cutting-and-creasing system as in claim 1, wherein an actuating unit is used to move said punching element between said withdrawn position and said cutting position.

6. The cutting-and-creasing system as in claim 5, wherein the actuating unit comprises a solenoid.

7. The cutting-and-creasing system as in claim 1, wherein an actuating unit is used to move said punching element between said withdrawn position and said cutting position, wherein said actuating unit is selected from a group of mechanisms including an eccentric mechanism, a hydraulic based mechanism and a pneumatic mechanism.

8. The cutting-and-creasing system as in claim 1, wherein all of said punching elements are activated according to a digitally pre-set physical template, operating all at once.

9. The cutting-and-creasing system as in claim 1, wherein said cutting-and-creasing bridge is mounted to move in said first, second and orthogonal directions.

10. The cutting-and-creasing system as in claim 1, wherein said punching elements each comprise a stem, and pentagonally-shaped blade end section protruding from said stem.

11. The cutting-and-creasing system as in claim 1, wherein said punching elements each comprise a stem, and a blunt end section protruding from said stem.

12. The cutting-and-creasing system as in claim 1, wherein said punching elements each comprise a conically-shaped stem, and a sharp-pointed conically end section protruding from said conically-shaped stem in an opposite conical direction.

13. The cutting-and-creasing system as in claim 1, wherein said punching elements each comprise a stem, and a sharp-pointed end section protruding from said stem and comprising parallel sides adjacent said stem and narrowing to a sharp point remote from said stem.

14. A The cutting-and-creasing system configured to form a predetermined pattern of cuts and creases within a cardboard, comprising:
   a) a conveyer supporting the cardboard;
   b) a cardboard-motion-control unit configured to control the motion of said conveyer in a first direction;
   c) at least one punching head unit including an array of punching elements that are individually and selectively actuatable by a punching-control-unit to move axially with a distal tip that faces said cardboard, between a withdrawn position and a cutting position, wherein said punching head unit is firmly held such that said punching elements are orthogonal to the cardboard;
   wherein said punching elements are distributed in a selected areal pattern within said array having said first direction and a second direction;
   said second direction is perpendicular to said first direction;
   said punching-control-unit is preconfigured to timely perform a punching step, the punching step includes moving one or more of said punching elements from said withdrawn position to said cutting position, relative to said conveyer, and immediately withdrawing said one or more of said punching elements to said withdrawn position, to thereby form through holes across said cardboard, or non-through holes, or cuts;
   a cut line is formed by a respective cluster of overlapping said through holes; and
   a crease line is formed by a respective cluster of either non-overlapping said through holes, or either overlapping or non-overlapping said non-through holes, or cuts;
   d) a cutting-and-creasing-bridge carrying said at least one punching head unit; and
   e) a bridge-motion-control module for moving said cutting-and-creasing-bridge in said first direction and in an orthogonal direction perpendicular to both said first direction and said second direction, wherein each said punching element is adapted to emit an elastomeric lubricating agent from a nozzle at an end of said punching element to thereby locally strengthen a crease line after a creasing operation by said punching element, to prevent tear of said crease line.

15. A cutting-and-creasing system configured to form a predetermined pattern of cuts and creases within a cardboard, comprising:
   a) a conveyer supporting the cardboard;
   b) a cardboard-motion-control unit configured to control the motion of said conveyer in a first direction;
   c) at least one punching head unit including an array of punching elements that are individually and selectively actuatable by a punching-control-unit to move axially with a distal tip that faces said cardboard, between a withdrawn position and a cutting position, wherein said punching head unit is firmly held such that said punching elements are orthogonal to the cardboard;
   wherein said punching elements are distributed in a selected areal pattern within said array having said first direction and a second direction;
   said second direction is perpendicular to said first direction;
   said punching-control-unit is preconfigured to timely perform a punching step, the punching step includes moving one or more of said punching elements from said withdrawn position to said cutting position, relative to said conveyer, and immediately withdrawing said one or more of said punching elements to said withdrawn position, to thereby form through holes across said cardboard, or non-through holes, or cuts;
   a cut line is formed by a respective cluster of overlapping said through holes; and
   a crease line is formed by a respective cluster of either non-overlapping said through holes, or either overlapping or non-overlapping said non-through holes, or cuts;
   d) a cutting-and-creasing-bridge carrying said at least one punching head unit; and
   e) a bridge-motion-control module for moving said cutting-and-creasing-bridge in said first direction and in an orthogonal direction perpendicular to both said first direction and said second direction,
   wherein each said punching element is adapted to emit etching liquid from a nozzle at an end of said punching element.

* * * * *